United States Patent
Wu et al.

(10) Patent No.: US 10,256,887 B2
(45) Date of Patent: Apr. 9, 2019

(54) DIFFERENTIAL CHANNEL STATE INFORMATION (CSI) REPORTING FOR HIGHER RESOLUTION CSI

(71) Applicant: QUALCOMM Incorporated, San Diego, CA (US)

(72) Inventors: Liangming Wu, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/928,326

(22) Filed: Mar. 22, 2018

(65) Prior Publication Data

US 2018/0278315 A1 Sep. 27, 2018

(30) Foreign Application Priority Data

Mar. 23, 2017 (WO) ................ PCT/CN2017/077831
Mar. 22, 2018 (WO) ................ PCT/CN2018/079975

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0478* (2013.01); *H04B 7/0632* (2013.01); *H04B 7/0645* (2013.01)

(58) Field of Classification Search
CPC .. H04B 7/0626; H04B 7/0456; H04B 7/0632; H04B 7/0639; H04B 7/0486; H04B 7/0417; H04L 1/0026
See application file for complete search history.

(56) References Cited

U.S. PATENT DOCUMENTS 8,315,221 B2 * 11/2012 Choudhury ........... H04L 1/0026
370/329
9,060,283 B2 * 6/2015 Ko ........................ H04W 24/00
(Continued)

FOREIGN PATENT DOCUMENTS

CN 103004104 A 3/2013
CN 106209299 A 12/2016
(Continued)

OTHER PUBLICATIONS

International Search Report and Written Opinion—PCT/CN2018/079975—ISA/EPO—dated Jun. 27, 2018.
Samsung: "Differential Type II CSI Reporting", R1-1702950, 3rd Generation Partnership Project (3GPP), Mobile Competence Centre; Route des Lucioles; F-06921 Sophia-Antipolis Cedex; France, vol. RAN WG1, Feb. 12, 2017, 8 pages.
(Continued)

*Primary Examiner* — Khanh C Tran
(74) *Attorney, Agent, or Firm* — Patterson & Sheridan, LLP

(57) ABSTRACT

Techniques and apparatus for differential channel state information (CSI) reporting for high resolution CSI are provided. One technique includes receiving a CSI reference signal (CSI-RS). First feedback components associated with first CSI feedback for a first CSI feedback stage are determined based on the CSI-RS, and the first feedback components are reported to a base station. Second feedback components associated with at least one second CSI feedback for at least one second CSI feedback stage are determined based in part on the first feedback components, and the second feedback components are reported to the base station. A precoding for multiple input multiple output (MIMO) communications is determined based on the first feedback components and the second feedback components.

28 Claims, 10 Drawing Sheets

(56) References Cited

U.S. PATENT DOCUMENTS

| | | | |
|---|---|---|---|
| 9,882,624 B2 | 1/2018 | Abraham et al. | |
| 2009/0154588 A1 | 6/2009 | Chen et al. | |
| 2014/0177683 A1* | 6/2014 | Krishnamurthy | H04B 7/0469 375/219 |
| 2014/0177745 A1* | 6/2014 | Krishnamurthy | H04B 7/0413 375/267 |
| 2014/0254508 A1* | 9/2014 | Krishnamurthy | H04B 7/0417 370/329 |
| 2015/0105119 A1* | 4/2015 | Eriksson | H04W 52/146 455/522 |
| 2016/0156401 A1* | 6/2016 | Onggosanusi | H04B 7/0478 370/329 |
| 2017/0047975 A1* | 2/2017 | Lee | H04L 5/0051 |
| 2017/0290053 A1* | 10/2017 | Hwang | H04W 76/10 |
| 2018/0091273 A1* | 3/2018 | Choi | H04L 5/0048 |
| 2018/0109352 A1* | 4/2018 | Nammi | H04L 1/0026 |
| 2018/0167116 A1* | 6/2018 | Rahman | H04B 7/04 |

FOREIGN PATENT DOCUMENTS

| | | |
|---|---|---|
| CN | 106537814 A | 3/2017 |
| WO | 2012044865 A1 | 4/2012 |

OTHER PUBLICATIONS

Samsung: "Type II CSI Reporting for NR", 3GPP Draft; R1-1700910; 3rd Generation Partnerstrip Project (3GPP); Mobile Competence Centre; 650, Route Des Lucioles; F-06921 Sophia-Antipolis Cedex; France, vol. RAN WG1, Jan. 16, 2017, 6 pages.

International Search Report and Written Opinion—PCT/CN2017/077831—ISA/EPO—dated Dec. 28, 2017.

Qualcomm Incorporated: "Discussion on Hybrid CSI-RS Based Operation for eFD-MIMO", 3GPP Draft; R1-164431, 3rd Generation Partnership Project (3GPP), Mobile Competence Centre; 650, Route Des Lucioles; F-06921 Sophia-Antipolis Cedex; France, vol. RAN WG1, No. Nanjing. China; May 14, 2016, XP051096449, 5 pages, Retrieved from the Internet: URL:http://www.3gpp.org/ftp/tsg_ran/WG1_RL1/TSGR1_85/Docs/ [retrieved on May 14, 2016].

Samsung: "CSI Acquisition for DL NR MIMO", R1-1612500, 3GPP TSG RAN WG1 Meeting #87 Reno, USA, Nov. 18, 2016, 4 pages.

Samsung: "Hybrid PMI Codebook Based CSI Reporting and Simulation Results", R1-164777, 3GPP TSG RAN WG1 Meeting #85 Nanjing, China, May 27, 2016, 8 pages.

\* cited by examiner

DIFFERENTIAL CHANNEL STATE INFORMATION (CSI) REPORTING FOR HIGHER RESOLUTION CSI

CROSS-REFERENCE TO RELATED APPLICATIONS & PRIORITY CLAIM

This application claims the benefit of and priority to International Patent Cooperation Treaty Application No. PCT/CN2018/079975, filed Mar. 22, 2018 and International Patent Cooperation Treaty Application No. PCT/CN2017/077831, filed Mar. 23, 2017, which are both hereby assigned to the assignee hereof and hereby expressly incorporated by reference herein as if fully set forth below and for all applicable purposes.

TECHNICAL FIELD

Aspects of the present disclosure relate generally to wireless communications systems, and more particularly, to techniques for differential channel state information (CSI) reporting. Embodiments can enable and provide wireless communication features aimed at robust CSI reporting, including, for example, differential CSI, per-stage or multi-stage CSI, and hybrid CSI, capable of yielding high-resolution CSI. Providing dynamic CSI as described can reduce overhead, component complexity, and performance loss.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for differential channel state information (CSI) reporting. Differential CSI techniques can yield improved wireless communications by providing channel information for use by communication components in wireless communication (e.g. in multi-antenna communications or MIMO scenarios). Channel knowledge can aid in helping to ensure communication across a wireless channel is reliable and stable with improved error rates and throughput.

Certain aspects of the present disclosure provide a method for wireless communication that may be performed, for example, by a user equipment (UE). The method generally includes receiving a channel state information reference signal (CSI-RS), determining, for a first CSI feedback stage, one or more first feedback components associated with first CSI feedback based on the CSI-RS, and reporting the one or more first feedback components. The method also includes determining, for at least one second CSI feedback stage, one or more second feedback components associated with at least one second CSI feedback based in part on the one or more first feedback components. The method further includes reporting the one or more second feedback components. In some scenarios, reporting and determination aspects may occur at differing times or substantially at about the same time.

Certain aspects of the present disclosure provide an apparatus for wireless communication. The apparatus generally includes means for receiving a channel state information reference signal (CSI-RS). The apparatus also includes means for determining, for a first CSI feedback stage, one or more first feedback components associated with first CSI feedback based on the CSI-RS, and means for determining, for at least one second CSI feedback stage, one or more second feedback components associated with at least one second CSI feedback based in part on the one or more first feedback components. The apparatus further includes means for reporting the one or more first feedback components and the one or more second feedback components.

Certain aspects of the present disclosure provide an apparatus for wireless communication. The apparatus generally includes a receiver, a transmitter, at least one processor and a memory coupled to the at least one processor. The receiver is configured to receive a channel state information reference signal (CSI-RS). The at least one processor is configured to determine, for a first CSI feedback stage, one or more first feedback components associated with first CSI feedback based on the CSI-RS, and determine, for at least one second CSI feedback stage, one or more second feedback components associated with at least one second CSI feedback based in part on the one or more first feedback components. The transmitter is configured to report the one or more first feedback components and the one or more second feedback components.

Certain aspects of the present disclosure provide a computer-readable medium having computer executable code stored thereon for wireless communication by an apparatus. The computer executable code generally includes code for receiving a channel state information reference signal (CSI-RS). The computer executable code also includes code for determining, for a first CSI feedback stage, one or more first feedback components associated with first CSI feedback based on the CSI-RS, and code for determining, for at least one second CSI feedback stage, one or more second feedback components associated with at least one second CSI feedback based in part on the one or more first feedback components. The computer executable code further includes code for reporting the one or more first feedback components and the one or more second feedback components.

Certain aspects of the present disclosure provide a method for wireless communication that may be performed, for example, by a base station (BS). The method generally includes receiving one or more first feedback components associated with first channel state information (CSI) feedback. The method also includes receiving one or more second feedback components associated with at least one second CSI feedback. The method further includes determining a precoding to use for multiple input multiple output (MIMO) communications based on the one or more first feedback components and the one or more second feedback components.

Certain aspects of the present disclosure provide an apparatus for wireless communication. The apparatus generally includes means for receiving one or more first feedback components associated with first channel state information (CSI) feedback and one or more second feedback components associated with at least one second CSI feedback. The apparatus further includes means for determining a precoding to use for multiple input multiple output (MIMO) communications based on the one or more first feedback components and the one or more second feedback components.

Certain aspects of the present disclosure provide an apparatus for wireless communication. The apparatus generally includes a receiver, at least one processor and a memory coupled to the at least one processor. The receiver is configured to receive one or more first feedback components associated with first channel state information (CSI) feedback, and receive one or more second feedback components associated with at least one second CSI feedback. The at least one processor is configured to determine a precoding to use for multiple input multiple output (MIMO) communications based on the one or more first feedback components and the one or more second feedback components.

Certain aspects of the present disclosure provide a computer-readable medium having computer executable code stored thereon for wireless communication by an apparatus. The computer executable code generally includes code for receiving one or more first feedback components associated with first channel state information (CSI) feedback, and code for receiving one or more second feedback components associated with at least one second CSI feedback. The computer executable code further includes code for determining a precoding to use for multiple input multiple output (MIMO) communications based on the one or more first feedback components and the one or more second feedback components.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
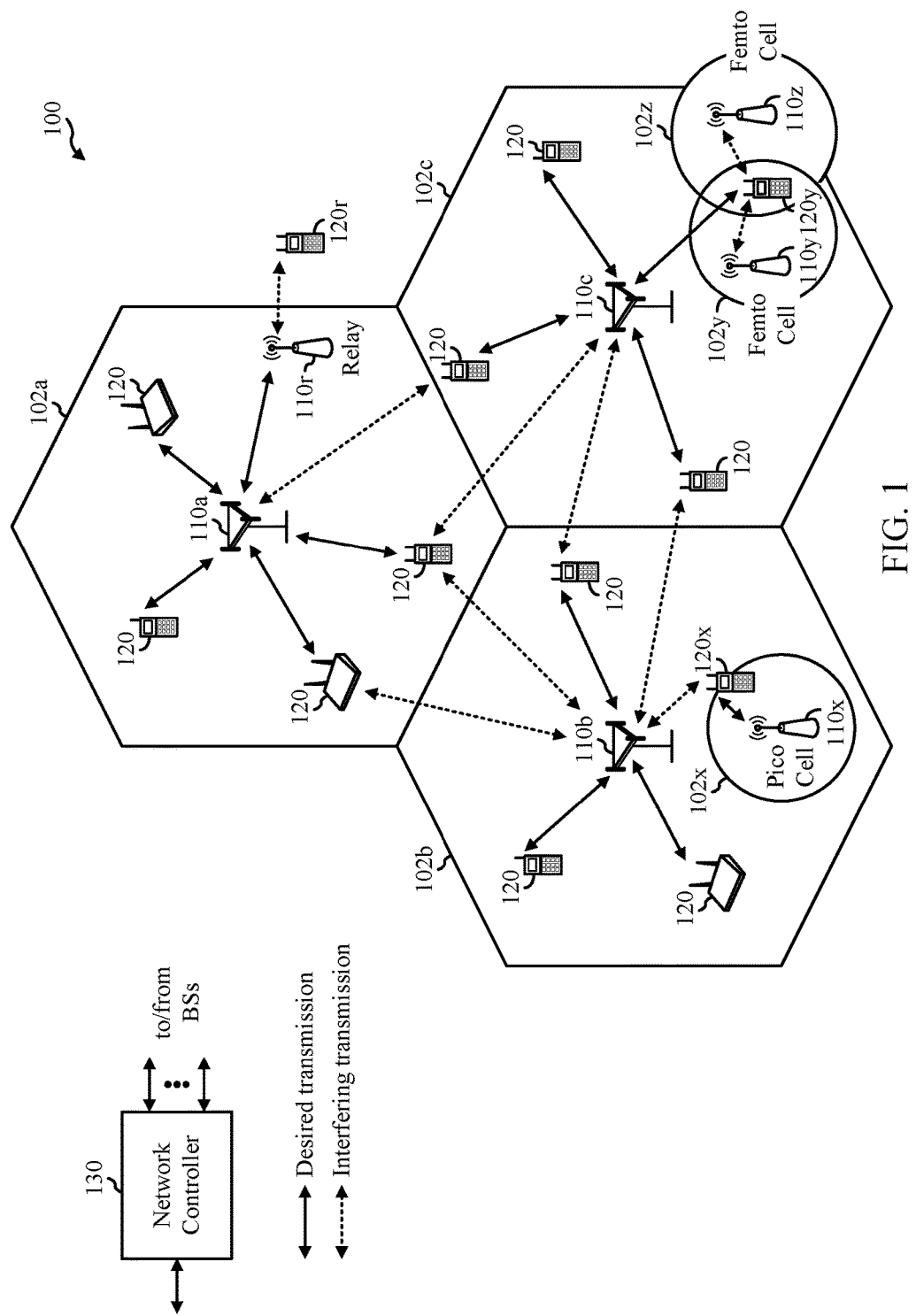
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). Deployments may be realized via 5G communications networks/systems as well as other types of devices, systems, and networks.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist (e.g., in the same subframe).

Some systems (e.g., LTE, NR, etc.) may support advanced CSI reporting in cases where legacy CSI reporting is insufficient to reflect channel information between base stations and UEs. Legacy CSI reporting, for example, generally assumes that the precoding matrix indicator (PMI) is constructed from a single beam, and thus may be insufficient for reflecting the channel information at larger antenna arrays (e.g., for MIMO communications). Advanced CSI reporting can improve CSI accuracy by combining multiple beams, such as discrete Fourier transform (DFT) beams, in the PMI. However, at the same time, advanced CSI reporting may also increase the feedback overhead and the UE processing complexity. Thus, it may be desirable to provide improved techniques for CSI reporting that provide sufficient channel information (e.g., for MIMO communications) while reducing the amount of increased feedback overhead associated with higher resolution CSI.

Aspects of the present disclosure provide techniques and apparatus for differential CSI reporting that can achieve high resolution CSI while reducing the per feedback overhead associated with advanced CSI reporting. For example, using the techniques presented herein, a UE may receive a CSI reference signal (CSI-RS) from a BS, determine, for a first CSI feedback stage, first feedback component(s) associated with first CSI feedback based on the CSI-RS, and report the first feedback components to the BS. The UE may then determine, for at least one second CSI feedback stage, second feedback component(s) associated with at least one second CSI feedback based in part on the first feedback components, and report the second feedback component(s) to the BS. Doing so enables the UE to report multiple CSI feedback (for a same received CSI-RS) in an incremental way (e.g., over time) over multiple CSI feedback stages, which in turn, can provide high resolution CSI while reducing the per feedback overhead generally associated with high resolution CSI (e.g., advanced CSI).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Example Wireless Communications System

FIG. 1 illustrates an example wireless network 100 in which aspects of the present disclosure may be performed. For example, the wireless network may be a new radio (NR) or 5G network. UE 120 may receive a CSI-RS from a BS 110. UE 120, in turn, may report CSI feedback in a differential manner. That is, when reporting CSI feedback based on the received CSI-RS, UE 120 may report multiple CSI feedback in an incremental way over multiple CSI feedback stages (or instances). In one example, UE 120 may determine, for a first CSI feedback stage, one or more first feedback components associated with first CSI feedback based on the CSI-RS, and report the first feedback components to the BS 110. The UE 120 may determine, for at least one second CSI feedback stage, one or more second feedback components associated with at least one second CSI feedback based in part on the first feedback components, and report the second feedback components to the BS.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. MTC devices and/or eMTC devices, as well as other types of devices, may include Internet of Everything (IoE) or Internet of Things (IoT) devices, such as NB-IoT devices, and techniques disclosed herein may be applied to MTC devices, eMTC devices, NB-IoT devices, as well as other devices. A wireless node may provide, for example, connectivity for or to a network (e.g., a wide area network such as Internet or a cellular network) via a wired or wireless communication link.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR (in one reference example) are described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
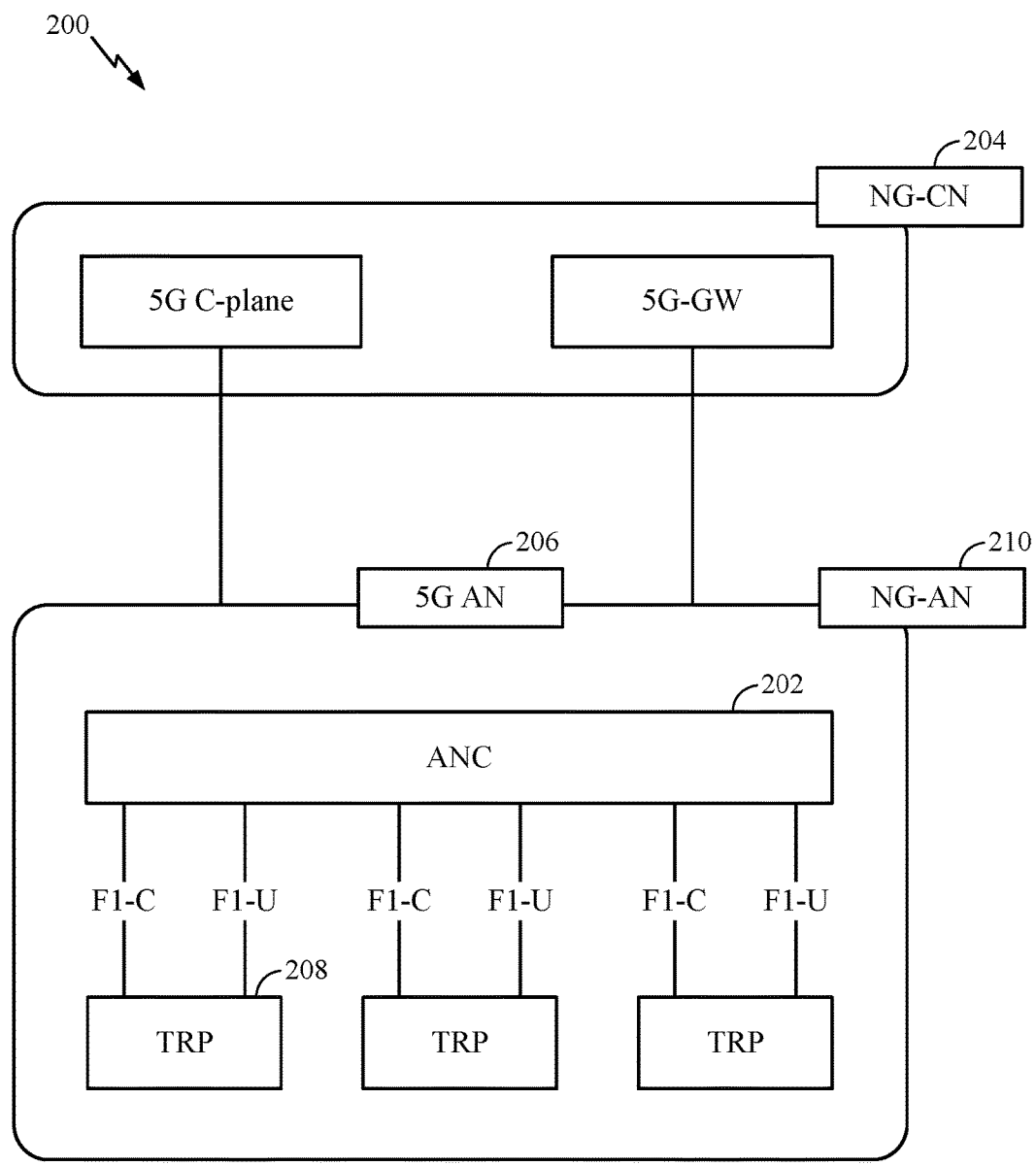
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
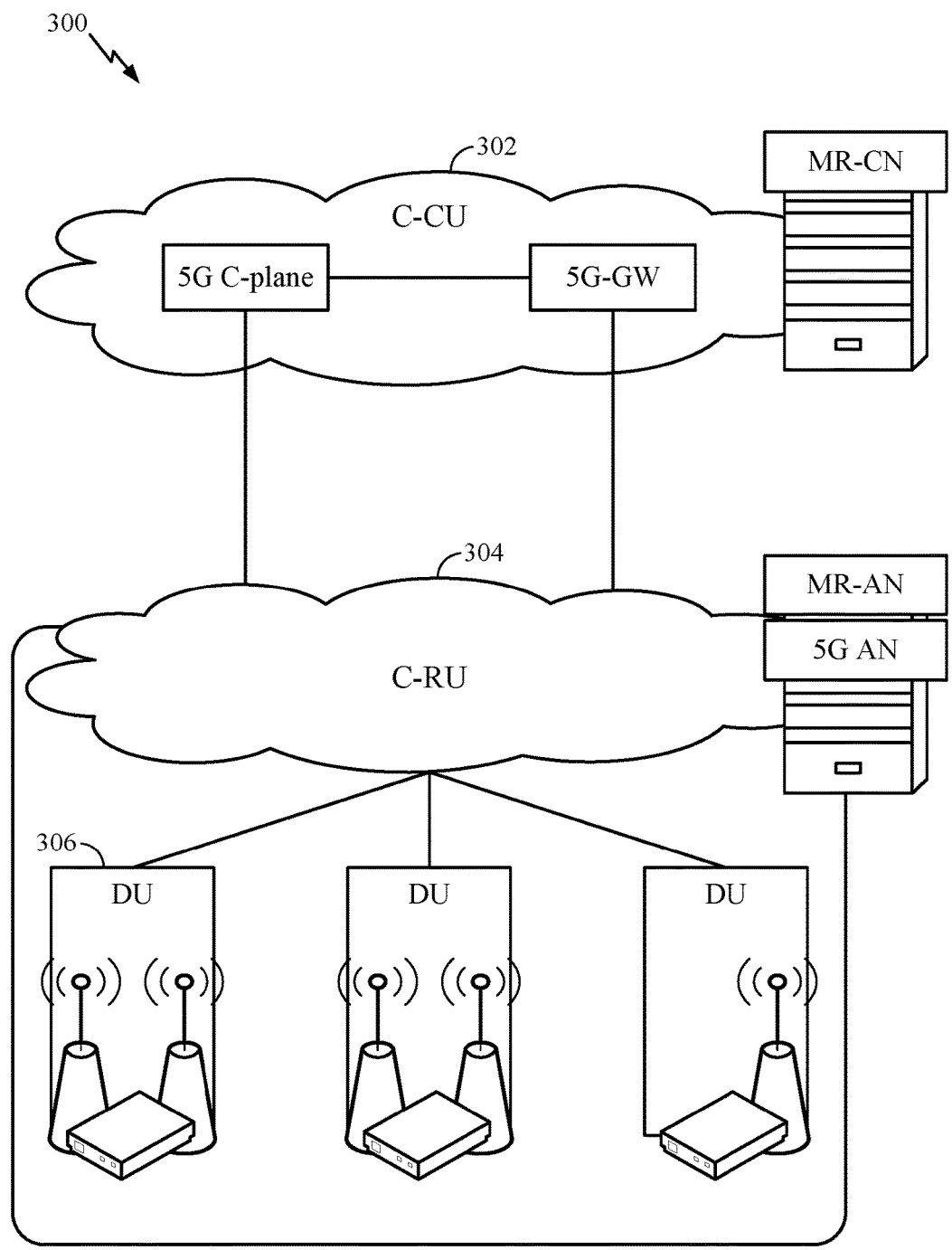
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
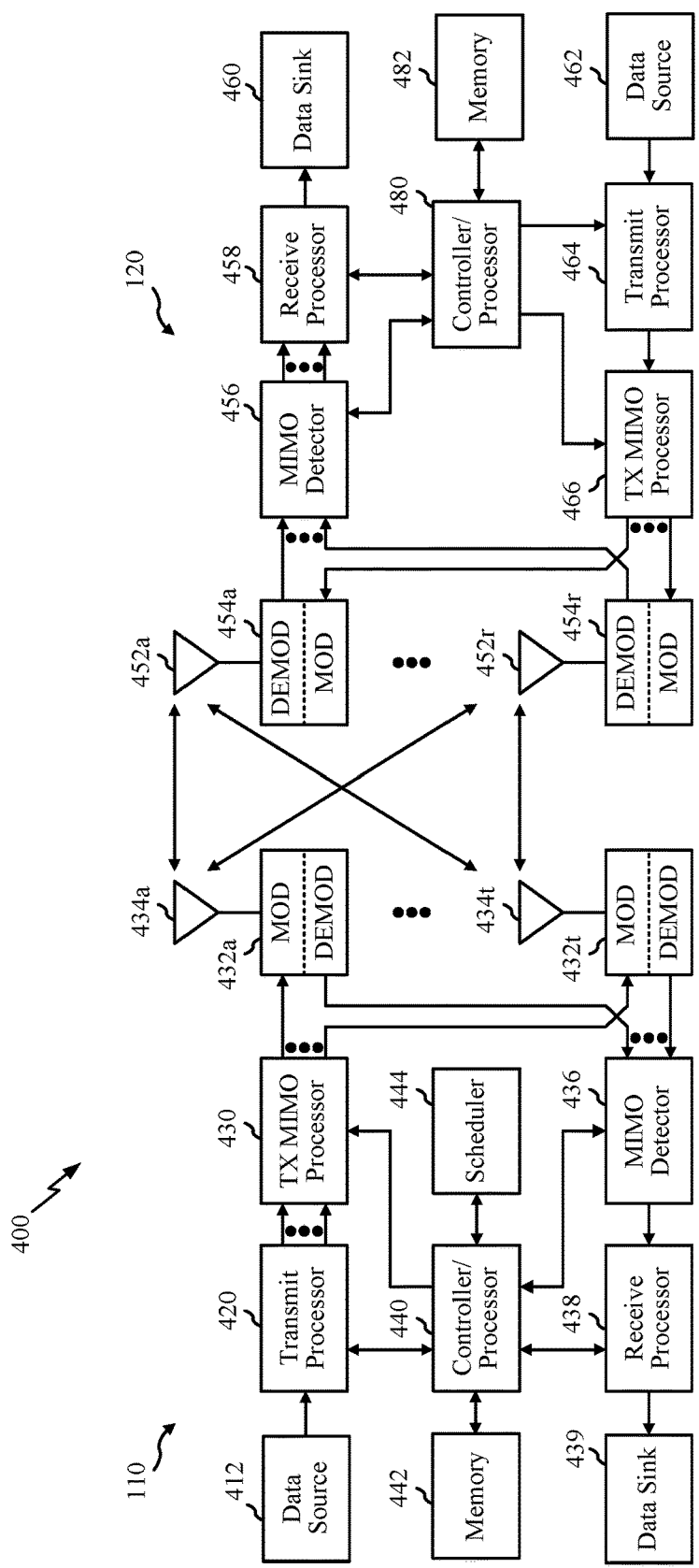
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The controller/processor 480 and/or other processors and modules at the UE 120 may also perform or direct, e.g., the execution of the functional blocks illustrated in FIG. 8, and/or other processes for the techniques described herein.

Figure 8:
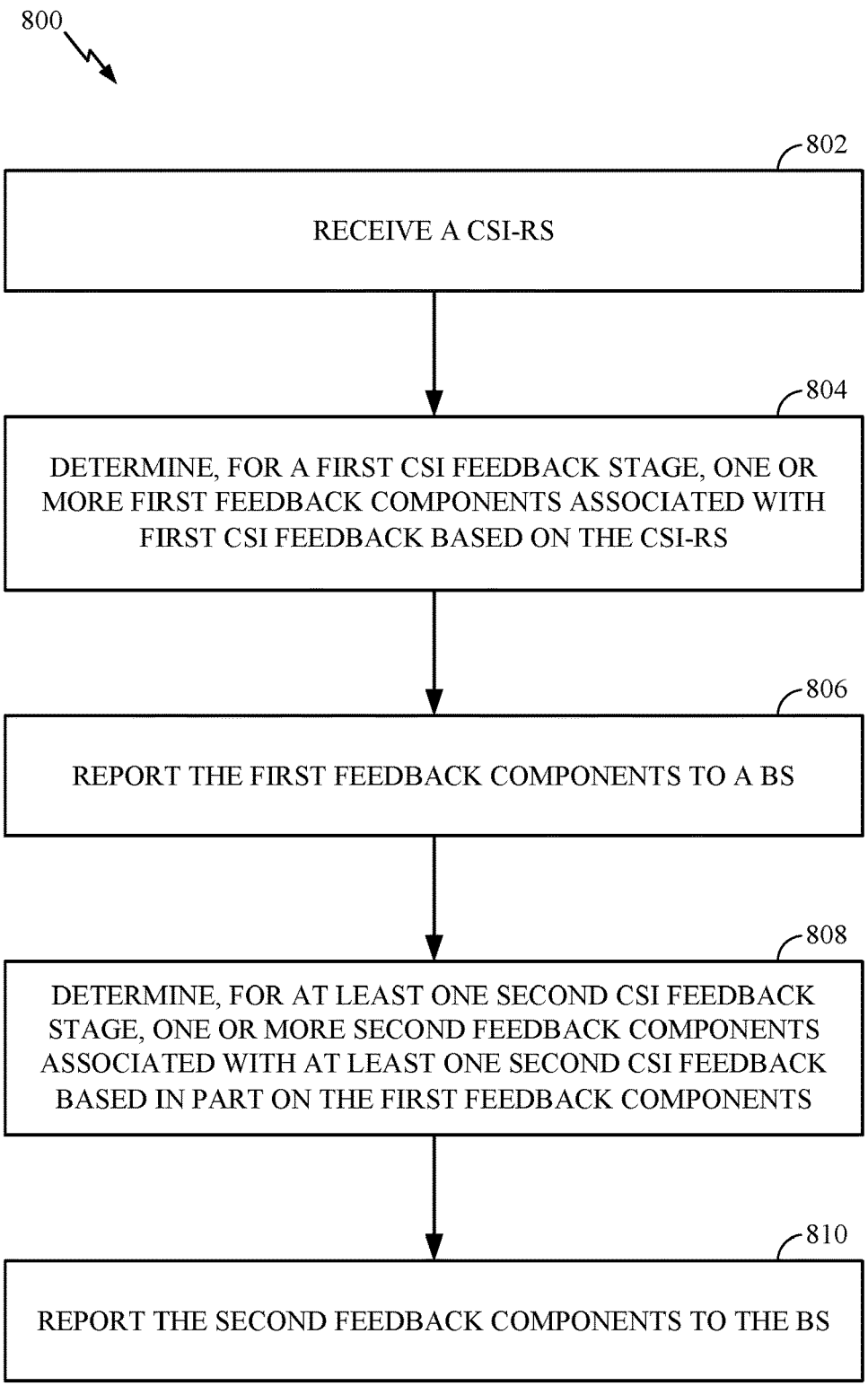
FIG. 8 is a flow diagram illustrating example operations that may be performed by a UE, for differential channel state information (CSI) feedback reporting, in accordance with certain aspects of the present disclosure.

By enabling controller/processor 480 and/or other modules at the UE to perform operations in FIG. 8 (e.g., for reporting differential CSI feedback based on a CSI-RS), the controller/processor 480 can provide full channel information (associated with high resolution CSI) while reducing the per feedback overhead typically associated with providing high resolution CSI.

Figure 9:
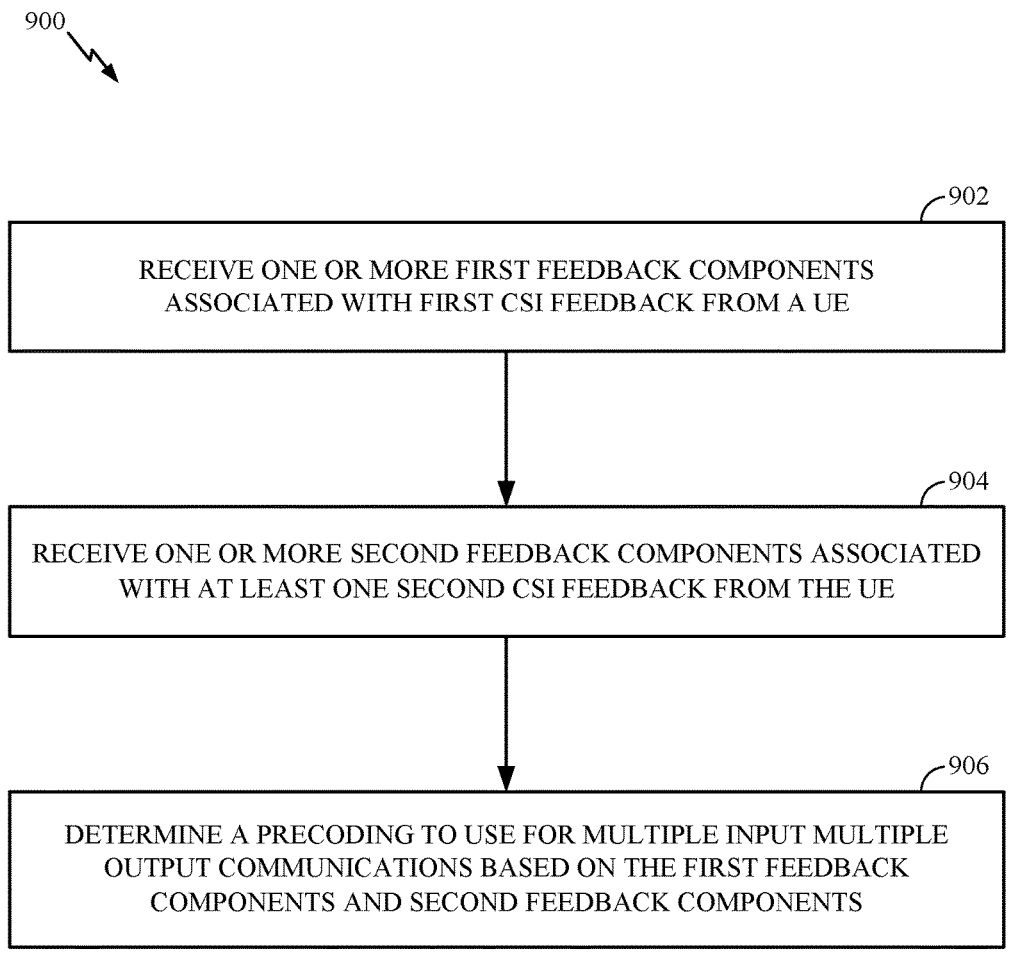
FIG. 9 is a flow diagram illustrating example operations that may be performed by a BS, for differential channel state information (CSI) feedback reporting, in accordance with certain aspects of the present disclosure.

The controller/processor 440 and/or other processors and modules at the BS 110 may also perform or direct, e.g., the execution of the functional blocks illustrated in FIG. 9, and/or other processes for the techniques described herein. By enabling controller/processor 440 and/or other modules at the BS to perform operations in FIG. 9, the controller/processor 440 can enable the BS to more efficiently acquire full channel information (e.g., the combined PMI as well as the CQI) for subsequent MIMO communications (e.g., based on the full channel information). The memories 442 and 482 may store data and program codes for the BS 110 and the UE 120, respectively. A scheduler 444 may schedule UEs for data transmission on the downlink and/or uplink.

Figure 5:
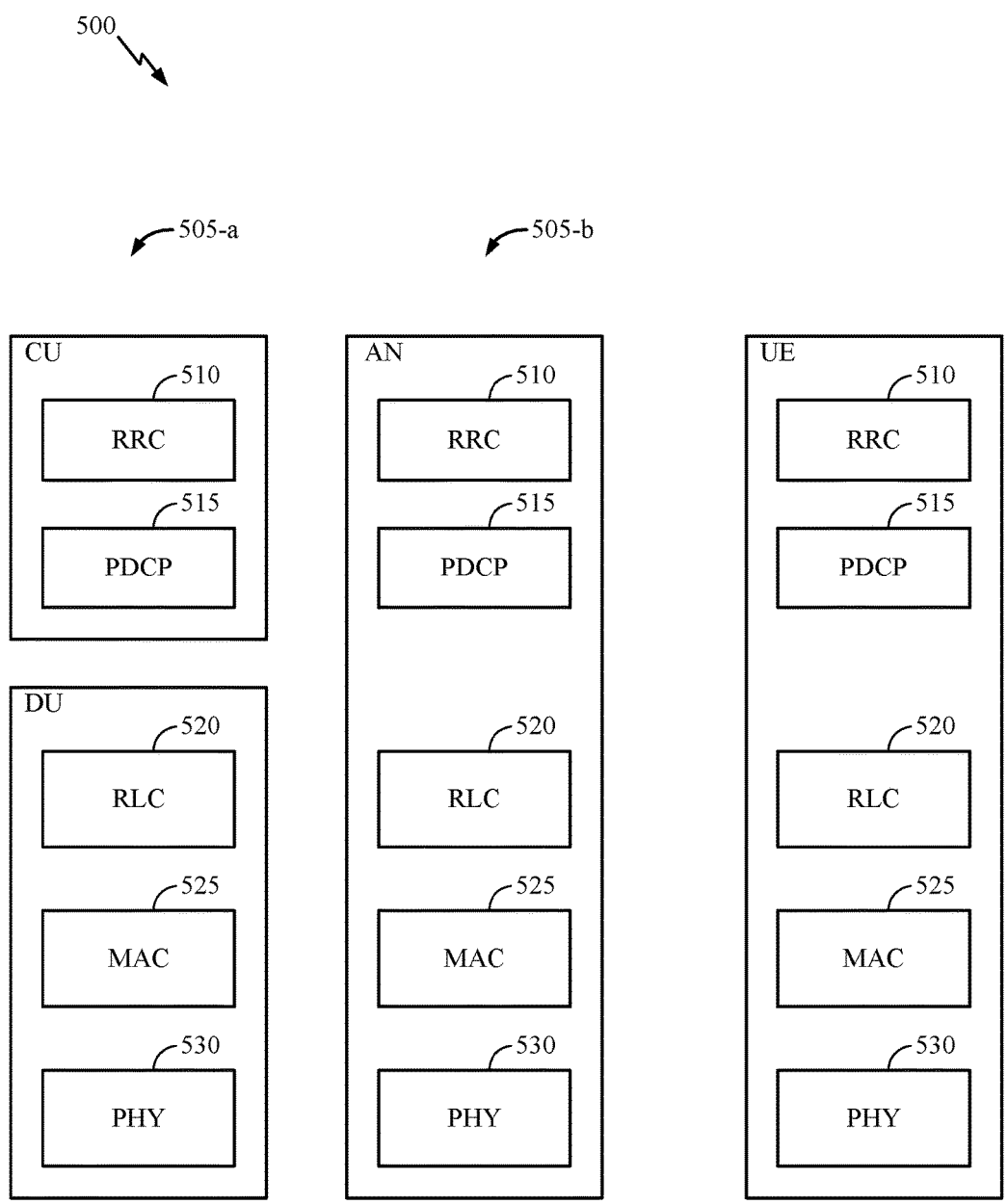
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
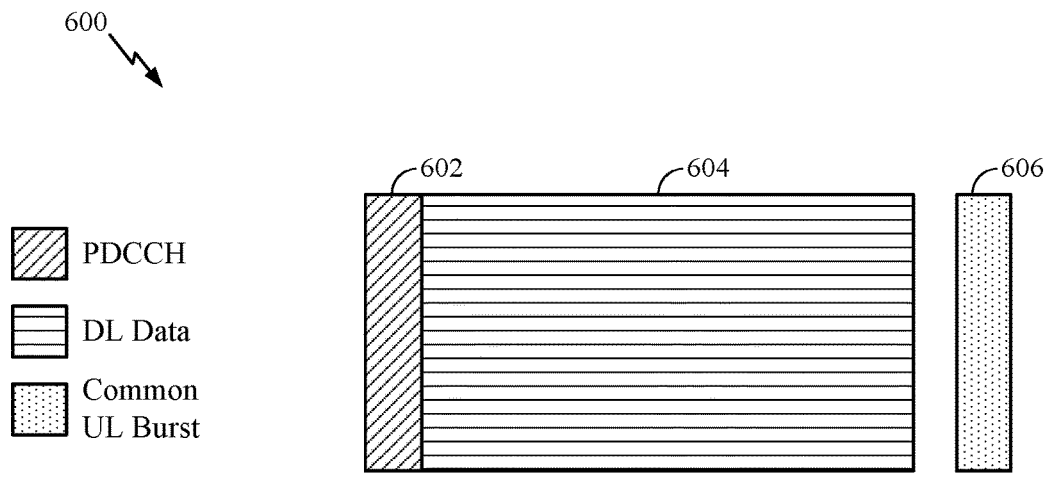
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
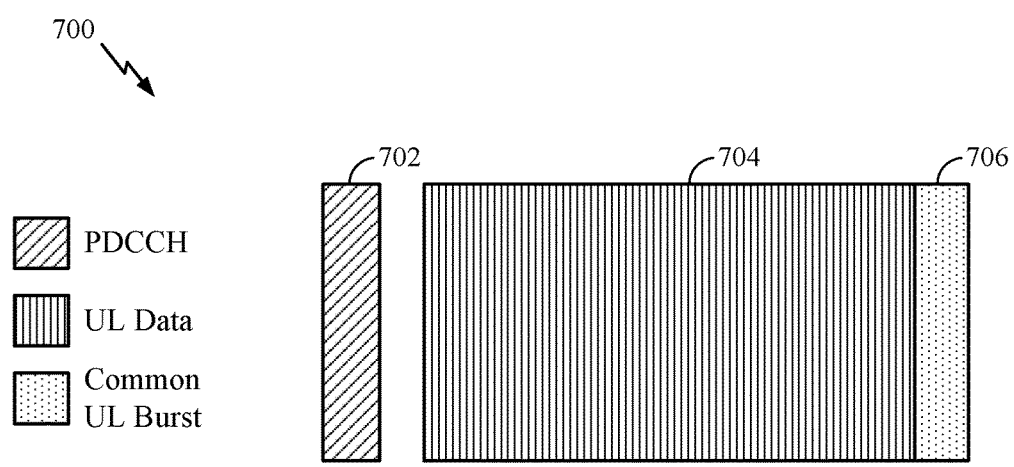
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In wireless communications, CSI may refer to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

In certain systems (e.g., Release 13 long term evolution (LTE)), CSI feedback is generally based on a pre-defined codebook. This may be referred to as implicit CSI feedback. Precoding may be used for beamforming in multi-antenna systems. Codebook based precoding uses a common codebook at the transmitter and receiver. The codebook includes a set of vectors and matrices. The UE calculates a precoder targeting maximum single-user (SU) multiple input multiple output (MIMO) spectrum efficiency. The implicit CSI feedback can include a rank indicator (RI), a PMI, and associated channel quality indicator (CQI) based on the PMI. The PMI includes a $W_1$ precoding matrix and a $W_2$ precoding matrix.

In 3GPP Release 13 Full-Dimension MIMO (FD-MIMO), an official name for the MIMO enhancement in 3GPP, class A and class B type CSI feedback assumes PMI is constructed from a single DFT beam or single beam selection. Thus, an issue with the legacy CSI reporting is that the legacy CSI reporting (which typically has a low CSI resolution) may be insufficient to reflect (e.g., full) channel information, which in turn can degrade SU/MU-MIMO performance, especially at larger antenna arrays.

Advanced CSI (Adv-CSI) reporting is thus proposed in Release 14 to improve CSI accuracy by combining multiple beams (e.g. DFT beams) based on power and/or phasing based codebook. Adv-CSI generally has a dual codebook structure $W=W_1W_2$. $W_1$ may be reported on the wideband, and $W_2$ may be reported on the subband. $W_1$ may include a set of L orthogonal beams, e.g., 2D-DFT beams. The set of L beams may be selected from a set of oversampled 2D-DFT beams. $W_1$ may be constructed based on the L orthogonal beams and their power weights.

For example, $$W_1 = \begin{bmatrix} B & 0 \\ 0 & B \end{bmatrix}, \text{where } B = [p_0 b_{k_1^{(0)},k_2^{(0)}}, \ldots, p_{L-1} b_{k_1^{(L-1)},k_2^{(L-1)}}],$$

L is the number of beams, $b_{k_1^{(i)},k_2^{(i)}}$ is a 2D-DFT beam (e.g., from an oversampled 2D-DFT grid), $k_1=0, 1, \ldots, N_1O_1-1$, $k_2=0, 1, \ldots, N_2O_2-1$, and $p_i$ (where $0 \leq p_i \leq 1$) is the beam power scaling factor (e.g., power weight) for beam i. $N_1$ is a size in a $1^{st}$ dimension (e.g., horizontal direction) and $N_2$ is a size in a $2^{nd}$ dimension (e.g., vertical direction). $O_1$ and $O_2$ are the oversampling factors in the $1^{st}$ and $2^{nd}$ dimensions, respectively. $W_2$ is the phase weight after $W_1$ and may include the phase quantization of beam combining coefficients. For rank 1, For $$W = \begin{bmatrix} \tilde{w}_{0,0} \\ \tilde{w}_{1,1} \end{bmatrix} = W_1 W_2 \text{ and } W_2 = \begin{bmatrix} c_{0,0} \\ c_{1,0} \end{bmatrix}.$$

rank 2, $$W = \begin{bmatrix} \tilde{w}_{0,0} & \tilde{w}_{0,1} \\ \tilde{w}_{1,0} & \tilde{w}_{1,1} \end{bmatrix} = W_1 W_2 \text{ and } W_2 = \begin{bmatrix} c_{0,0} & c_{0,1} \\ c_{1,0} & c_{1,1} \end{bmatrix}.$$

$$c_{r,l} = [c_{r,l,0}, \ldots, c_{r,l,L-1}]^T,$$

where $c_{r,l,i}$ is the beam combining coefficient for beam i on polarization r and layer l, r=0, 1, and l=0,1. $\tilde{w}_{r,l} = \sum_{i=0}^{L-1} b_{k_1^{(i)},k_2^{(i)}} \cdot p_i \cdot c_{r,l,i}$, where r=0,1 and l=0, 1.

Assuming $W_1$ is constructed based on 2 orthogonal beams and their power weights, $W_1$ can be represented as $W_1 = I_2 \oplus$ (B×P), where B=[$b_0$ $b_1$], $b_0$ and $b_1$ are orthogonal 2D-DFT beams, P=[$p_0 p_1$], and $p_0$, $p_1$ are the power weight on the $1^{st}/2^{nd}$ beam, respectively. Note $I_2 \oplus$ represents the same weight on the cross polarization (X-Pol). The selection of $b_0$ ($1^{st}$ beam) may be from the oversampled 2D-DFT beam grids. For example, for the $1^{st}$ leading (stronger) beam index, $k_1^{(0)}$=0, 1, ..., $N_1 O_1$−1 and $k_2^{(0)}$=0,1, ..., $N_2 O_2$−1. The selection of $b_1$ ($2^{nd}$ beam) may be dependent on the $1^{st}$ beam, with a maximum of 3 bits to indicate the relationship with the $1^{st}$ beam. For example, for the $2^{nd}$ (weaker) beam index, $k_1^{(1)}$=$k_1^{(0)}$+$O_1 d_1$ and $k_2^{(1)}$=$k_2^{(0)}$+$O_2 d_2$, where $d_1 \in \{0, \ldots, \min(N_1 L_1 - 1)\}$, $d_2 \in \{0, \ldots, \min(N_2 L_2 - 1)\}$ and $(d_1, d_2) \neq (0,0)$. If $N_1 \geq N_2$ and $N_2 \neq 1$, then $L_1$=4 and $L_2$=2. If $N_1 < N_2$ and $N_1 \neq 1$, then $L_1$=2 and $L_2$=4. If $N_2$=1, then $L_1$=8 and $L_2$=1. In some cases, $O_1$=$O_2$=4. In some cases, if $N_2$=1, $O_2$=1. In some cases, $2N_1 N_2 \in \{4, 8, 12, 16, 20, 24, 28, 32\}$.

For $W_1$, P generally represents a 2 bit quantization of the power weight. In some cases, $p_0$=1 and $p_1 \in \{1, \sqrt{0.5}, \sqrt{0.25}, 1\}$. For $W_2$, $c_{0,0,0}$=$c_{0,1,0}$=1, where $c_{r,l,i} \in \{1, j, -1, -j\}$ $\forall$ i, r, l. QPSK quantization may be used for each phase except $c_{0,0,0}$=$c_{0,1,0}$=1. For $W_1$, the codebook payload may include 13 bits for rank 1 and 13 bits for rank 2. For $W_2$, the codebook payload may include 6 bits for rank 1 and 12 bits for rank 2.

Generally, Type I feedback (e.g., implicit CSI feedback) includes normal codebook-based PMI feedback with normal (low) spatial resolution, whereas Type II feedback includes enhanced "explicit" feedback and/or codebook-based feedback with higher spatial resolution. In NR, CSI feedback may support advanced CSI feedback at least in Type II feedback. The "resolution" of CSI feedback (e.g., codebook) may refer to the amount of information in the channel feedback and/or quality of the channel feedback. For example, lower resolution feedback, such as Type I feedback, may have a lower spatial resolution (reflecting a smaller number of the propagation paths of the channel between the transmitter and the receiver) compared to higher resolution feedback, such as Type II feedback, which may have a higher spatial resolution (reflecting a larger number of the propagation paths of the channel between the transmitter and the receiver). With lower resolution feedback, the BS may obtain a coarse approximation of the channel. However, such a coarse approximation may not be able to obtain sufficient performance for MIMO communications. Higher resolution feedback may enable the BS to obtain a more accurate approximation of the channel, which can boost the efficiency of MIMO communications.

There may be some drawbacks associated with advanced CSI reporting including, e.g., increases in feedback overhead, increased UE processing complexity and/or possible performance losses compared to legacy CSI reporting. In one reference example, the $W_1$ overhead for $N_1$=$N_2$=4 (in Adv-CSI) may include a total of 13 bits, where 8 bits (e.g., $\lceil \log 2(N_1 N_2 O_1 O_2) \rceil$=$\lceil \log 2(16 N_1 N_2) \rceil$=8) are used to indicate the leading $1^{st}$ beam, 3 bits are used to indicate the $2^{nd}$ beam, and 2 bits are used to indicate the relative power of the $2^{nd}$ beam. In some cases, advanced CSI reporting may achieve performance gain at the cost of an increased codebook size, which generally means that the total feedback overhead is increased. In such cases, the increased payload size associated with the feedback may exceed a limit (e.g., the limited payload size associated with periodic reporting on PUCCH). Additionally, in some cases, advanced CSI reporting may achieve performance gain at the cost of increased UE processing complexity. Further, in some cases, if the quantization for advanced CSI reporting is not properly configured (e.g., high resolution CSI is generally associated with high quantization levels), legacy CSI reporting may outperform advanced CSI reporting.

Certain aspects of the present disclosure provide techniques and apparatus for achieving high resolution CSI while reducing the per feedback overhead associated with advanced CSI reporting. As used herein, differential CSI reporting may refer to reporting multiple CSI feedback reports in an incremental way over time via multiple CSI feedback stages. That is, each CSI feedback reported by the UE in a given CSI feedback stage may depend in part on a previous CSI feedback reported by the UE in a previous CSI feedback stage. Each CSI feedback stage may occur at a different point in time. Using the differential CSI reporting scheme described herein (as opposed to a CSI reporting scheme in which each CSI feedback is independent) enables the BS to more efficiently acquire full channel information (e.g., the combined PMI as well as the CQI) that the BS can use for subsequent MIMO communications. That is, the BS may not have to perform additional calculations to obtain the channel information.

FIG. 8 is a flow diagram illustrating example operations 800 that may be performed, for example, by a UE (e.g., UE 120), for differential CSI reporting, in accordance with certain aspects of the present disclosure.

Operations 800 may begin, at 802, where the UE receives a CSI-RS (e.g., from a BS, such as BS 110). At 804, the UE determines, for a first CSI feedback stage, one or more first feedback components associated with first CSI feedback based on the CSI-RS. At 806, the UE reports the first feedback components to the BS. In some aspects, the UE may report the first feedback components by generating a message that includes the first feedback components and transmitting the message to the BS.

At 808, the UE determines, for at least one second CSI feedback stage, one or more second feedback components associated with at least one second CSI feedback based in part on the first feedback components. At 810, the UE reports the second feedback components to the BS. In some aspects, the UE may report the second feedback components by generating a message that includes the second feedback components and transmitting the message to the BS.

Note that the UE may perform one or more of the operations at 802-810 at the same time or at different times. In some aspects, the UE may perform the operations at 804 and 808 at different times or at the same time. In some aspects, the UE may perform the operations at 806 and 810 at different times. In some aspects, the UE may perform operations 806 and/or 810 only, or perform operations 806 and/or 808 in addition to operations 804 and/or 808. In some aspects, the UE may perform operations 806 and/or 810 after performing operations 802, 804 and/or 808.

FIG. 9 is a flow diagram illustrating example operations 900 that may be performed, for example, by a BS (e.g., BS 110), for receiving differential CSI feedback and using the CSI feedback for communications, in accordance with certain aspects of the present disclosure.

Operations 900 may begin, at 902, where the BS receives one or more first feedback components associated with first CSI feedback from a UE (e.g., UE 120). At 904, the BS receives one or more second feedback components associated with at least one second CSI feedback from the UE. At 906, the BS determines a precoding to use for MIMO communications based on the first feedback components and the second feedback components. The BS may perform MIMO communications with the UE based on the determined precoding.

According to certain aspects, techniques presented herein may enable differential CSI reporting (e.g., in operations 800 and operations 900) by changing the structure of the codebook design of LTE Adv-CSI. Consider, for example, the following codebook design (1) of LTE Adv-CSI, in which the codebook W is constructed with 2 beams combination and rank 1:

$$W = W_1 W_2 = \begin{bmatrix} p_0 b_{k_1^0, k_2^0}, p_1 b_{k_1^1, k_2^1} & 0 \\ 0 & p_0 b_{k_1^0, k_2^0}, p_1 b_{k_1^1, k_2^1} \end{bmatrix} \begin{bmatrix} c_{0,0} \\ c_{1,0} \end{bmatrix} \quad (1)$$

where $c_{r,\lambda} = [c_{r,\lambda,0}, c_{r,\lambda,1}]^T$, $b_{k_1^l, k_2^l}$ is the DFT beam vector for the $l^{th}$ beam, $p_l$ is the power weighting for the $l^{th}$ beam, and $c_{r,\lambda,0}$ is the cophasing for polarization r, rank $\lambda$, beam l, $c_{0,\lambda,0}=1$. In some cases, a fixed beam power may be used for the first beam (i.e., $p_0=1$ for l=0).

In some aspects, the techniques presented herein may change the codebook design in (1) to the following codebook design in (2) in order to enable differential CSI reporting:

$$W = W_1^0 W_2^0 + W_1^1 W_2^1 = \begin{bmatrix} p_0 b_{k_1^0, k_2^0} & 0 \\ 0 & p_0 b_{k_1^0, k_2^0} \end{bmatrix} \begin{bmatrix} c_{0,0,0} \\ c_{1,0,0} \end{bmatrix} + \begin{bmatrix} p_1 b_{k_1^1, k_2^1} & 0 \\ 0 & p_1 b_{k_1^1, k_2^1} \end{bmatrix} \begin{bmatrix} c_{0,0,1} \\ c_{1,0,1} \end{bmatrix}. \quad (2)$$

In some aspects, $W_1^0 W_2^0$ may represent the normal or lower resolution part of the codebook (e.g., $1^{st}$ CSI feedback). For example, the "lower resolution" may include a small amount of information representing a coarse approximation of the channel (e.g., $W_1^0 W_2^0$ includes the power weighting and cophasing for a single (first) beam). In some aspects, $W_1^1 W_2^1$ may represent the higher resolution part of the codebook (e.g., $2^{nd}$ CSI feedback). With each additional CSI feedback stage, the CSI feedback may include additional information representing a more detailed approximation of the channel (e.g., $W_1^1 W_2^1$ includes an additional second beam's coefficients). Additionally, the higher resolution part of the codebook may further include additional stages of CSI feedback (e.g., $3^{rd}$ CSI feedback, $4^{th}$ CSI feedback, $5^{th}$ CSI feedback, and so on).

The differential CSI feedback described herein may include multiple CSI feedback reports, where each CSI feedback report depends in part on a previous CSI feedback. By using a differential CSI feedback scheme, in which each CSI feedback report depends in part on a previous CSI feedback, the BS can more efficiently acquire full channel information (e.g., the combined PMI as well as the CQI) for an accurate approximation of the channel, without performing additional calculations typically associated with CSI feedback schemes in which each CSI feedback report is independent. The $1^{st}$ CSI feedback may be based on the feedback of "lower resolution" CSI. Examples of such "lower resolution" CSI may include class A type CSI (e.g., for LTE), Type I CSI (e.g., for NR-MIMO), advanced (e.g., Type II) CSI configured with 2 beams, etc. Note, however, that the techniques presented herein can be applied to situations in which more than two beams are used (e.g., three beams, four beams, etc.). The $1^{st}$ CSI feedback may include a complete CSI report with PMI, CQI and RI included. The $2^{nd}$ to $m^{th}$ CSI feedback may include the additional beams' coefficients for combination. For example, each CSI$_x$ may include PMI$_x$/CQI$_x$/RI$_x$ for the $x^{th}$ reporting instance, where $2 \leq x \leq m$.

In some aspects, the BS may signal an indication of a codebook configuration for the UE to use for the $1^{st}$ CSI feedback. In one example, the codebook configuration may be based on LTE class A type codebook with antenna port number, oversampling rate, and other configuration parameters (e.g., 'Config' 1, 'Config' 2, etc.). In one example, the codebook configuration can be based on Type II CSI reporting in NR-MIMO with 2 beams combination. In some cases, the codebook configuration (for the $1^{st}$ CSI feedback) may also include information such as quantizations, power weighting mechanism, etc. to use for the $1^{st}$ CSI feedback. The UE may calculate (or determine) the lower resolution CSI based in part on the configuration of the lower resolution CSI codebook, and report the $1^{st}$ CSI feedback to the BS. In some cases, the UE may use one or more metrics, such as spectrum efficiency, to determine the reported CSI, which includes RI/PMI/CQI. The PMI may be inclusive of beam selection (wideband or subband) and co-phasing factor.

In some aspects, the BS may configure the UE with the codebook parameters of the differential higher resolution ($2^{nd}$ to $m^{th}$) CSI feedback. For example, the BS may signal an indication of one or more codebook parameters for the UE to use for the differential higher resolution CSI (e.g., the at least one second ($2^{nd}$ to $m^{th}$) CSI feedback). The codebook parameters may include the maximum supported rank ($RI_{x\_max}$) for the at least one second CSI feedback stage, the number of stages of the higher resolution CSI (e.g., x−1), the number of feedback beams $N_x$ for each stage (e.g., $N_1=1$, $N_2=2$, $N_3=1$, resulting in a 4 beam combination), power weighting for each stage, cophasing indication for each stage, etc. The UE may determine the higher resolution CSI based on the previous lower resolution CSI and the configured differential higher resolution CSI codebook, and report the higher resolution CSI to the BS.

According to certain aspects, $RI_x$ includes the rank for the differential CSI feedback reported during the $x^{th}$ reporting instance. $RI_x$ of the $2^{nd}$ to $x^{th}$ CSI feedback may be the same or different as the RI of the $1^{st}$ CSI feedback. For example, in some cases, the UE may determine (after reporting the $1^{st}$ CSI feedback) that the channel has an update (e.g., the rank supported by the UE may be reduced on the $2^{nd}$ PMI or other subsequent CSI feedback instances). In such cases, the UE may have to use the differential CSI part (e.g., $RI_x$) for the subsequent CSI feedback (e.g., $2^{nd}$ PMI, etc.).

In one aspect, if $RI_x \leq RI$ (of the $1^{st}$ CSI feedback) and $RI_x \leq RI_{x\_max}$, then the first $RI_x$ layers of the selected beam and cophasing for the $1^{st}$ CSI report may be used in the higher resolution CSI feedback calculation. For example, assume RI (of the $1^{st}$ CSI feedback)=2, but in the second stage the UE wants to use $RI_2=1$. In this example, the UE may select the $1^{st}$ layer from the $1^{st}$ CSI report, and use the beam and/or cophasing parameters from the $1^{st}$ layer of the $1^{st}$ CSI report for the calculation of the $2^{nd}$ CSI feedback (CSI$_2$).

In one aspect, $RI_x$ may be the same for each of the $2^{nd}$ to $m^{th}$ CSI feedbacks. In such cases, the UE may report $RI_x$ for the $2^{nd}$ CSI feedback and refrain from reporting RI for the $3^{rd}$ to $m^{th}$ CSI feedback stages.

According to certain aspects, the PMI for each stage of the higher resolution CSI feedback may include at least one of a beam indication for one or more beams, a power weighting for the one or more beams, or cophasing indicator for the one or more beams. For example, PMI$_x$ may include a beam indication of $N_x$ beams. The $l^{th}$ beam indication ($b_{k_1^l,k_2^l}$) may be orthogonal and constrained to the beams of the $1^{st}$ CSI feedback (e.g., $b_{k_1^0,k_2^0}$). In other words, $k_1^l=k_1^0+O_1 d_{1,l}$ and $k_2^l=k_2^0+O_2 d_{2,l}$, where $(d_{1,l}, d_{2,l}) \neq (0,0)$. The reporting of $d_{1,l}$, $d_{2,l}$ may be used to index the beam for the $l^{th}$ beam. In one example, $d_{1,l}$, $d_{2,l}$ are fed back on the wideband. $PMI_x$ may also include the power weighting and cophasing indicator for the $N_x$ beams (e.g., $p_1$, $c_{0,0,1}$, $c_{1,0,1}$, assuming a 2 beams linear combination and $RI_x=1$). The power weighting and cophasing indicator can be fed back on the wideband or subband. The $W_1^{x-1} W_2^{x-1}$ precoding feedback components may be constructed by the beam and power/cophasing coefficients.

In some aspects, the CQI for each stage of the higher resolution CSI feedback may be based on the PMI of the $1^{st}$ CSI feedback through $x^{th}$ CSI feedback. For example, $CQI_x$ may be associated with $PMI_{1-x}$ that is created by the $1^{st}$ to $x^{th}$ CSI reporting. In this case, for each $CQI_x$, the selected beam and cophasing achieved in the previous CSI reporting ($PMI_{x-1}$, assuming $x=2$) is incorporated as part of the code book. For example, if 1 beam was configured for $x=2$, $b_{k_1^0,k_2^0}$ and $c_{1,0,0} \sim c_{1,RI_x,0}$ in $W_1^0 W_2^0$ is incorporated as part of the calculation for $CQI_2$. In this case, $CQI_x$ ($x=2$) is calculated based on $W = W_1^0 W_2^0 + W_1^1 W_2^1$ for the $2^{nd}$ CSI feedback. In some aspects, $CQI_x$ can represent the CQI for W, or represent the differential CQI over the CQI in the $1^{st}$ CSI feedback (e.g., $\Delta CQI_x = CQI_x - CQI$).

Figure 10:
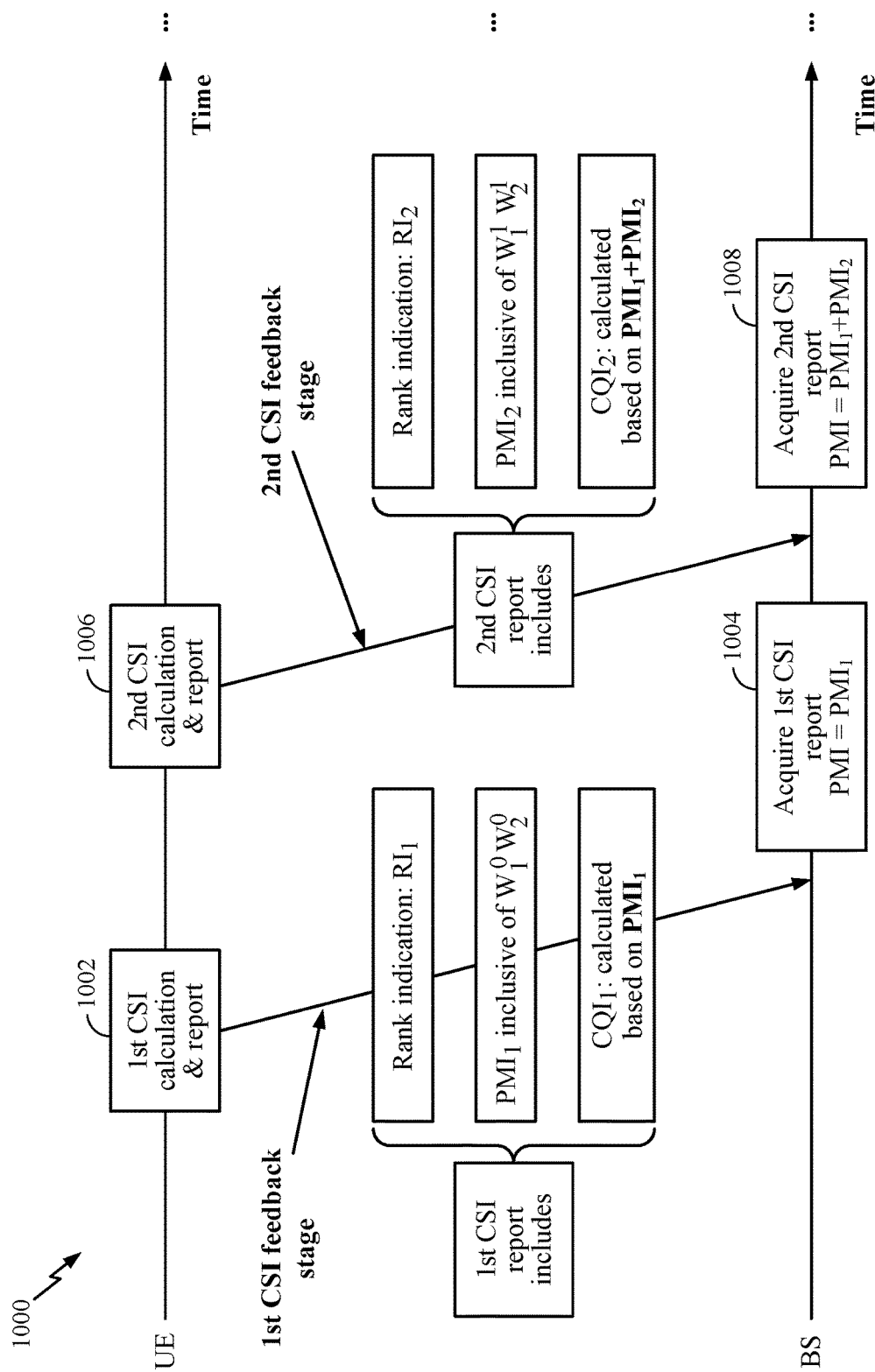
FIG. 10 is a call flow diagram illustrating example signaling and differential CSI feedback reporting, in accordance with certain aspects of the present disclosure.

FIG. 10 is a call flow diagram 1000 illustrating example signaling and differential CSI feedback reporting over multiple CSI feedback stages (e.g., at least two CSI feedback stages), in accordance with certain aspects of the present disclosure. Each CSI feedback stage (or instance) may refer to a different instance in time in which the UE reports CSI feedback. The CSI feedback reported in a given CSI feedback stage may be based in part, on CSI feedback reported in a previous CSI feedback stage and/or a received CSI-RS (e.g., in the case of the first CSI feedback stage). Note that while the differential CSI feedback reporting in FIG. 10 uses advanced CSI in Type II CSI feedback as a reference example of a CSI feedback scheme used by the UE, those of ordinary skill in the art will recognize that the differential CSI feedback reporting techniques described herein can be used for other types of CSI feedback schemes.

At 1002, for the first CSI feedback stage, the UE performs a $1^{st}$ CSI calculation (e.g., based on a received CSI-RS, not shown) and reports the $1^{st}$ CSI feedback to the BS. The $1^{st}$ CSI report includes $RI_1$, $PMI_1$ and $CQI_1$ (which is calculated based on $PMI_1$). $PMI_1$ includes feedback components $W_1^0 W_2^0$. At 1004, the BS acquires the $1^{st}$ CSI report and sets $PMI=PMI_1$. At 1006, for the second CSI feedback stage, the UE subsequently performs a second CSI calculation and reports the $2^{nd}$ CSI feedback to the BS. The $2^{nd}$ CSI report includes $RI_2$, $PMI_2$ and $CQI_2$ (which is calculated based on $PMI_1+PMI_2$). $PMI_2$ includes feedback components $W_1^1 W_2^1$. At 1008, the BS acquires the $2^{nd}$ CSI report and sets $PMI=PMI_1+PMI_2$. Although not shown, the UE may continue to perform CSI calculations and send CSI reports (e.g., 3rd CSI report, $4^{th}$ CSI report, and so on) in additional CSI feedback stages (e.g., $3^{rd}$ CSI feedback stage, $4^{th}$ feedback stage, and so on). Similarly, although not shown, the BS may receive the CSI reports in the additional CSI feedback stages and determine PMI based on the CSI report received in the current CSI feedback stage and the CSI report(s) received in the previous CSI feedback stage(s).

Figure 11:
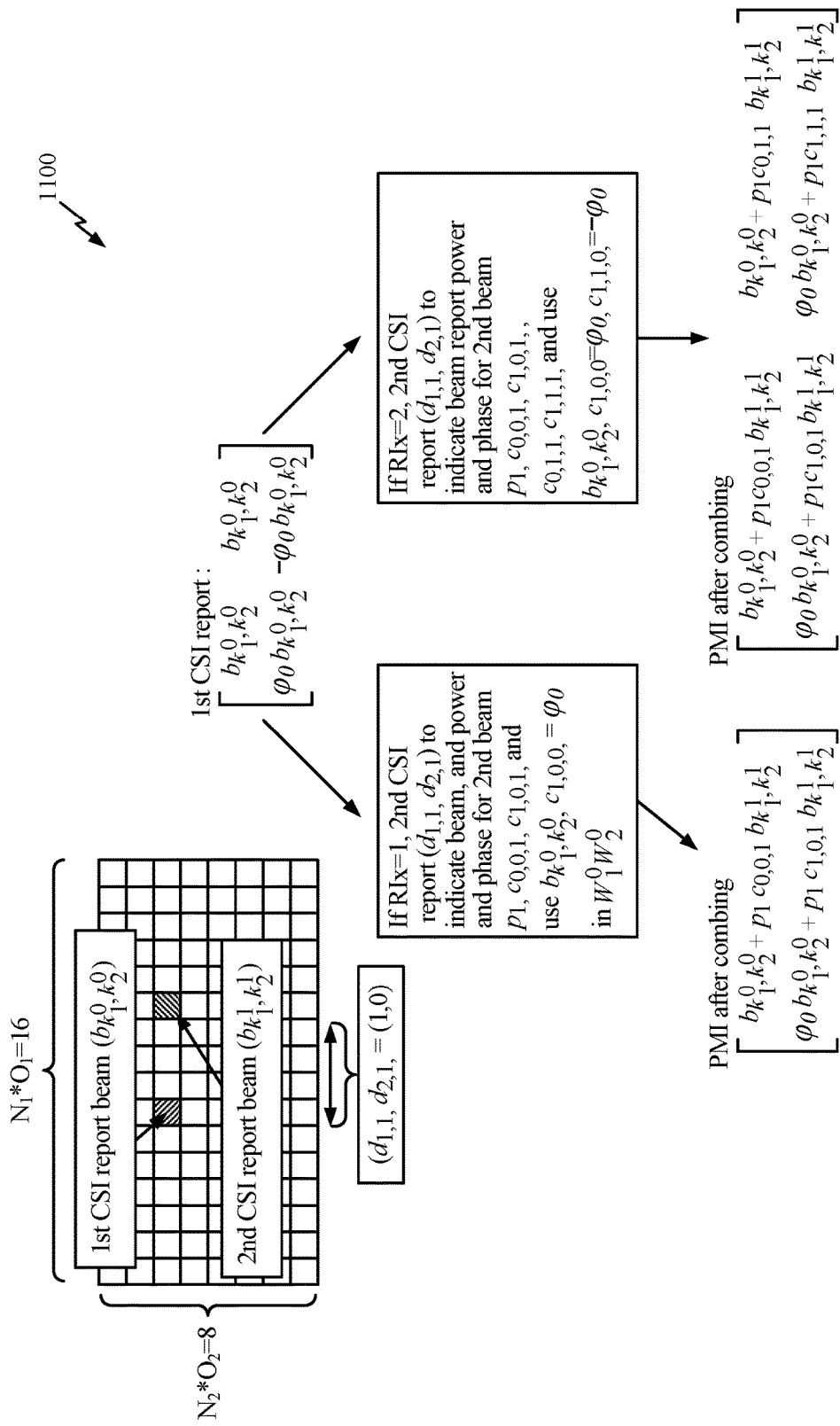
FIG. 11 illustrates an example of differential CSI reporting with multiple stages, in accordance with certain aspects of the present disclosure.

FIG. 11 illustrates an example of differential CSI reporting with multiple stages (e.g., 2 stages, 2 beams combination), in accordance with certain aspects of the present disclosure. In this example, the $1^{st}$ CSI report is based on class A type codebook with 'Config 1', $(N_1,N_2)=(4,2)$, $(O_1,O_2)=(4,4)$, and rank=2. The $1^{st}$ CSI report is defined in (3) below:

$$W_1^0 W_2^0 = \begin{bmatrix} b_{k_1^0,k_2^0} & b_{k_1^0,k_2^0} \\ \varphi_0 b_{k_1^0,k_2^0} & -\varphi_0 b_{k_1^0,k_2^0} \end{bmatrix} \quad (3)$$

The $2^{nd}$ CSI report is inclusive of the beam indication ($d_{1,1}$, $d_{2,1}$) and power/co-phase indications. If $RI_2=1$ (where $RI_2$ is the RI for the $2^{nd}$ CSI report, $x=2$), the $2^{nd}$ CSI report may include the beam indications ($d_{1,1}$, $d_{2,1}$), power weight ($p_1$) and cophase ($c_{0,0,0}$, $c_{1,0,1}$) for the $2^{nd}$ beam (e.g., in the $2^{nd}$ CSI report), and use $b_{k_1^0,k_2^0}$, $c_{1,0,0}=\varphi_0$ in $W_1^0 W_2^0$. If $RI_2=2$, the $2^{nd}$ CSI report may include the beam indications ($d_{1,1}$, $d_{2,1}$), power weight ($p_1$) and cophase ($c_{0,0,0}$, $c_{1,0,1}$, $c_{0,1,1}$, $c_{1,1,1}$) for the $2^{nd}$ beam (e.g., in the $2^{nd}$ CSI report), and use $b_{k_1^0,k_2^0}$, $c_{1,0,0}=\varphi_0$, $c_{1,1,0}=-\varphi_0$ in $W_1^0 W_2^0$.

As shown, once the $2^{nd}$ CSI is combined with the $1^{st}$ CSI report, the final precoder can be derived. For example, after combining, the BS may determine the PMI is equal to W in (4) if $RI_2=1$, and determine the PMI is equal to W in (5) if $RI_2=2$.

$$W = W_1^0 W_2^0 = \begin{bmatrix} b_{k_1^0,k_2^0} & b_{k_1^0,k_2^0} \\ \varphi_0 b_{k_1^0,k_2^0} & -\varphi_0 b_{k_1^0,k_2^0} \end{bmatrix} \quad (4)$$

$$W = \begin{bmatrix} b_{k_1^0,k_2^0}+p_1 c_{0,0,1} b_{k_1^1,k_2^1} & b_{k_1^0,k_2^0}+p_1 c_{0,1,1} b_{k_1^1,k_2^1} \\ \varphi_0 b_{k_1^0,k_2^0}+p_1 c_{1,0,1} b_{k_1^1,k_2^1} & \varphi_0 b_{k_1^0,k_2^0}+p_1 c_{1,1,1} b_{k_1^1,k_2^1} \end{bmatrix} \quad (5)$$

As noted, the differential CSI feedback reporting techniques described herein can be used for other CSI feedback schemes (e.g., in addition to the advanced CSI Type II CSI feedback). For example, in some aspects, the differential CSI feedback reporting techniques may be used for Type II single-panel (SP) codebook (e.g., for NR MIMO).

For Type II SP codebook, NR may support Type II Category 1 CSI for rank 1 and rank 2. The PMI may be used for spatial channel information feedback. For rank 1, the PMI codebook may have the following precoder structure in (6), and for rank 2, the PMI codebook may have the following precoder structure in (7):

$$W = \begin{bmatrix} \tilde{w}_{0,0} \\ \tilde{w}_{1,0} \end{bmatrix} = W_1 W_2 \quad (6)$$

$$W = \begin{bmatrix} \tilde{w}_{0,0} & \tilde{w}_{0,1} \\ \tilde{w}_{1,0} & \tilde{w}_{1,1} \end{bmatrix} = W_1 W_2, \quad (7)$$

where W is normalized to 1 in (6), columns of W are normalized to $$\frac{1}{\sqrt{2}}$$

in (7) and $\tilde{w}_{r,l}$ is defined in (8).

The PMI codebook may include a weighted combination of L beams. For example, as shown in (8):

$$\tilde{w}_{r,l} = \sum_{i=0}^{L-1} b_{k_1^{(i)},k_2^{(i)}} \cdot p_{r,l,i}^{(WB)} \cdot p_{r,l,i}^{(SB)} \cdot c_{r,l,i} \quad (8)$$

where the value of L is configurable (e.g., L∈{2, 3, 4}), $b_{k_1^{(i)},k_2^{(i)}}$ is an oversampled 2D-DFT beam, r=0, 1 (polarization), l=0, 1 (layer), $p_{r,l,i}^{(WB)}$ is the wideband (WB) beam amplitude scaling factor for beam i on polarization r and layer l, $p_{r,l,i}^{(SB)}$ is the subband (SB) beam amplitude scaling factor for beam i on polarization r and layer l, and $c_{r,l,i}$ is the beam combining coefficient (phase) for beam i on polarization r and layer l. $c_{r,l,i}$ may be configurable between QPSK (2 bits) and 8PSK (3 bits). Type II SP may support a configurable amplitude scaling mode between WB+SB (with unequal bit allocation) and WB-only.

According to certain aspects, techniques presented herein may enable differential CSI reporting for Type II CSI for NR-MIMO by adapting the current Type II SP codebook structure. For the differential CSI report, the PMI in each feedback stage may have the same structure. Assuming there are 2 CSI feedback stages, the $1^{st}$ PMI may include the beam selection indication, dominant beam indication and rotation factor. The beam selection indication, dominant beam indication and rotation factor for the $2^{nd}$ PMI may have the same values as the corresponding components (or parameters) in the $1^{st}$ PMI. Thus, the UE may not feed back these components in the $2^{nd}$ PMI. The amplitude (wideband/subband) and phase (subband) components may be fed back in differential manner by the $1^{st}$ and $2^{nd}$ PMI. In some aspects, for a total of 2L elements, at most L non-zero wideband amplitude elements and their associated subband parameters may be fed back in a given PMI. For example, assuming there are 2 CSI feedback stages, L elements may be fed back in the $1^{st}$ PMI and another L elements may be feedback in the $2^{nd}$ PMI.

In some aspects, the codebook design for the differential CSI report may be represented as $W = B \times P_{wb} \times C_{sb}$, where B is defined in (9), $P_{wb}$ is defined in (10) and $C_{sb}$ is defined in (11), assuming L=3:

$$B = \begin{bmatrix} b_0 & b_1 & b_2 & 0 & & \\ 0 & & & b_0 & b_1 & b_2 \end{bmatrix} \quad (9)$$

$$P_{wb} = \begin{bmatrix} p_{wb,0,0} & 0 & 0 & & & \\ 0 & p_{wb,1,0} & 0 & & 0 & \\ 0 & 0 & p_{wb,2,0} & & & \\ & & & p_{wb,0,1} & 0 & 0 \\ & 0 & & 0 & p_{wb,1,1} & 0 \\ & & & 0 & 0 & p_{wb,2,1} \end{bmatrix} \quad (10)$$

$$C_{sb} = \begin{bmatrix} p_{sb,0,0}c_{0,0} \\ p_{sb,1,0}c_{1,0} \\ p_{sb,2,0}c_{2,0} \\ p_{sb,0,1}c_{0,1} \\ p_{sb,1,1}c_{1,1} \\ p_{sb,2,1}c_{2,1} \end{bmatrix} \quad (11)$$

For B defined in (9), $b_0$, $b_1$ and $b_2$ are 2D-DFT orthogonal beams. In some aspects, $b_0 \sim b_2$ may be fed back by the $1^{st}$ PMI and may not be included in the $2^{nd}$ PMI. In some aspects, $b_0 \sim b_2$ may be included also in the $2^{nd}$ PMI. For $P_{wb}$ defined in (10), the $1^{st}$ PMI feedback may include L elements, which can be indicated by the non-zero wideband amplitude. For example, for the $1^{st}$ PMI feedback, $p_{wb,0,0}$, $p_{wb,0,1}$ and $p_{wb,1,1}$ are non-zero, and $p_{wb,1,0}$, $p_{wb,2,0}$ and $p_{wb,2,1}$ are zero. The $2^{nd}$ PMI feedback may include L elements, which can be indicated by the non-zero wideband amplitude. For example, for the $2^{nd}$ PMI feedback, $p_{wb,1,0}$, $p_{wb,2,0}$ and $p_{wb,2,1}$ are non-zero, and $p_{wb,0,0}$, $p_{wb,0,1}$ and $p_{wb,1,1}$ are zero.

Thus, in the $1^{st}$ PMI feedback, the non-zero wideband amplitude components ($p_{wb,0,0}$, $p_{wb,0,1}$ and $p_{wb,1,1}$) and their associated subband amplitude and phase components ($p_{sb,0,0}c_{0,0}$, $p_{sb,0,1}c_{0,1}$ and $p_{sb,1,1}c_{1,1}$) (e.g., in $c_{sb}$ in (11)) may be fed back and the zero wideband amplitude components ($p_{wb,1,0}$, $p_{wb,2,0}$ and $p_{wb,2,1}$) and their associated subband amplitude and phase components ($p_{sb,1,0}c_{1,0}$, $p_{sb,2,0}c_{2,0}$ and $p_{sb,2,1}c_{2,1}$) may not be fed back. In the $2^{nd}$ PMI feedback, the non-zero wideband amplitude components ($p_{wb,1,0}$, $p_{wb,2,0}$ and $p_{wb,2,1}$) and their associated subband amplitude and phase components $p_{sb,1,0}c_{1,0}$, $p_{sb,2,0}c_{2,0}$ and $p_{sb,2,1}c_{2,1}$) (e.g., in $c_{sb}$ in (11)) may be fed back and the zero wideband amplitude components ($p_{wb,0,0}$, $p_{wb,0,1}$ and $p_{wb,1,1}$) and their associated subband amplitude and phase components ($p_{sb,0,0}c_{0,0}$, $p_{sb,0,1}c_{0,1}$ and $p_{sb,1,1}c_{1,1}$) may not be fed back.

Advantageously, the techniques presented here provide an improved differential CSI reporting design that can be used to provide high resolution CSI while reducing the amount of per feedback overhead typically associated with reporting high resolution CSI.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for feeding back, means for reporting, means for performing, means for calculating, means for generating, means for adding, means for precoding, means for transmitting, means for receiving, means for sending, means for refraining, means for indicating, means for setting, means for signaling, means for configuring, means for selecting, means for applying, means for weighting, means for conveying, means for identifying, and/or means for decoding may include a processing system, which may include one or more processors or other elements, such as the transmit processor 464, the controller/processor 480, the receive processor 458, and/or antenna(s) 452 of the user equipment 120 illustrated in FIG. 4, and/or the transmit processor 420, the controller/processor 440, the receive processor 438, and/or antenna(s) 434 of the base station 110 illustrated in FIG. 4.

Means for transmitting, means for sending, means for signaling, means for indicating, means for reporting, means for communicating, means for feeding back and/or means for conveying may include a transmitter, which may include a transmit processor 464, MOD(s) 454, and/or antenna(s) 452 of the user equipment 120 illustrated in FIG. 4, and/or the transmit processor 420, MOD(s) 432, and/or antenna(s) 434 of the base station 110 illustrated in FIG. 4. Means for receiving may include a receiver, which may include receiver processor 458, DEMOD(s) 454, and/or antenna(s) 452 of the user equipment 120 illustrated in FIG. 4, and/or the receive processor 438, MOD(s) 432, and/or antenna(s) 434 of the base station 110.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
receiving a channel state information reference signal (CSI-RS);
determining, for a first CSI feedback stage, one or more first feedback components associated with first CSI feedback based on the CSI-RS;
reporting the one or more first feedback components;
determining, for at least one second CSI feedback stage, one or more second feedback components associated with at least one second CSI feedback based in part on the one or more first feedback components, wherein the first CSI feedback has a lower resolution than the at least one second CSI feedback; and
reporting the one or more second feedback components.

2. The method of claim 1, wherein:
the one or more first feedback components comprise a first precoding matrix indicator (PMI), a first channel quality indicator (CQI) and a first rank indicator (RI);
the one or more first feedback components are associated with class A type CSI feedback, Type I CSI feedback or Type II CSI feedback; and
the one or more second feedback components comprise a second PMI, a second CQI and a second RI associated with second CSI feedback of the at least one second CSI feedback.

3. The method of claim 2, wherein:
the second RI is the same as the first RI; or
the second RI is different from the first RI.

4. The method of claim 2, wherein:
the first PMI comprises a beam selection for a first one or more beams, a power weighting for the first one or more beams and cophasing indicator for the first one or more beams; and
the second PMI comprises a beam indication for a second one or more beams, a power weighting for the second one or more beams, and cophasing indicator for the second one or more beams.

5. The method of claim 2, wherein the second CQI is determined based on the first PMI and second PMI.

6. The method of claim 1, further comprising:
receiving signaling indicating a codebook configuration for the first CSI feedback, wherein the one or more first feedback components are determined further based on the codebook configuration.

7. The method of claim 1, further comprising:
receiving signaling indicating one or more codebook parameters for the at least one second CSI feedback, wherein the one or more second feedback components are determined further based on the one or more codebook parameters.

8. The method of claim 7, wherein the one or more codebook parameters comprise at least one of a number of the at least one second CSI feedback stage, a maximum supported rank for the at least one second CSI feedback stage, a number of beams for each of the at least one second CSI feedback stage, a power weighting for each of the at least one second CSI feedback stage, or a cophasing indication for each of the at least one second CSI feedback stage.

9. A method for wireless communications by a base station (BS), comprising:
receiving one or more first feedback components associated with first channel state information (CSI) feedback;
receiving one or more second feedback components associated with at least one second CSI feedback; and
determining a precoding to use for multiple input multiple output (MIMO) communications based on the one or more first feedback components and the one or more second feedback components.

10. The method of claim 9, wherein:
the one or more first feedback components comprise a first precoding matrix indicator (PMI), a first channel quality indicator (CQI) and a first rank indicator (RI);
the one or more first feedback components are associated with class A type CSI feedback, Type I CSI feedback or Type II CSI feedback; and
the one or more second feedback components comprise a second PMI, a second CQI and a second RI associated with second CSI feedback of the at least one second CSI feedback.

11. The method of claim 10, wherein:
the first PMI comprises a beam selection for a first one or more beams, a power weighting for the first one or more beams and cophasing indicator for the first one or more beams; and
the second PMI comprises a beam indication for a second one or more beams, a power weighting for the second one or more beams, and cophasing indicator for the second one or more beams.

12. The method of claim 10, wherein determining the precoding comprises adding the first PMI to the second PMI.

13. The method of claim 9, further comprising:
signaling an indication of a codebook configuration for the first CSI feedback, wherein the codebook configuration is based on class A type CSI feedback, Type I CSI feedback or Type II CSI feedback.

14. The method of claim 9, further comprising:
signaling an indication of one or more codebook parameters for the at least one second CSI feedback, wherein the one or more codebook parameters comprise at least one of a number of second CSI feedback stages for reporting the at least one second CSI feedback, a maximum supported rank for the second CSI feedback stages, a number of beams for each of the second CSI feedback stages, a power weighting for each of the second CSI feedback stages, or a cophasing indication for each of the second CSI feedback stages.

15. An apparatus for wireless communication, comprising:
a receiver configured to receive a channel state information reference signal (CSI-RS);
at least one processor configured to:
determine, for a first CSI feedback stage, one or more first feedback components associated with first CSI feedback based on the CSI-RS; and
determine, for at least one second CSI feedback stage, one or more second feedback components associated with at least one second CSI feedback based in part on the one or more first feedback components, wherein the first CSI feedback has a lower resolution than the at least one second CSI feedback;
a transmitter configured to report the one or more first feedback components and the one or more second feedback components; and
a memory coupled to the at least one processor.

16. The apparatus of claim 15, wherein:
the one or more first feedback components comprise a first precoding matrix indicator (PMI), a first channel quality indicator (CQI) and a first rank indicator (RI);
the one or more first feedback components are associated with class A type CSI feedback, Type I CSI feedback or Type II CSI feedback; and
the one or more second feedback components comprise a second PMI, a second CQI and a second RI associated with second CSI feedback of the at least one second CSI feedback.

17. The apparatus of claim 16, wherein:
the second RI is the same as the first RI; or
the second RI is different from the first RI.

18. The apparatus of claim 16, wherein:
the first PMI comprises a beam selection for a first one or more beams, a power weighting for the first one or more beams and cophasing indicator for the first one or more beams; and
the second PMI comprises a beam indication for a second one or more beams, a power weighting for the second one or more beams, and cophasing indicator for the second one or more beams.

19. The apparatus of claim 16, wherein the second CQI is determined based on the first PMI and second PMI.

20. The apparatus of claim 15, wherein:
the receiver is further configured to receive signaling indicating a codebook configuration for the first CSI feedback; and
the at least one processor is configured to determine the one or more first feedback components further based on the codebook configuration.

21. The apparatus of claim 15, wherein:
the receiver is further configured to receive signaling indicating one or more codebook parameters for the at least one second CSI feedback; and
the at least one processor is configured to determine the one or more second feedback components further based on the one or more codebook parameters.

22. The apparatus of claim 21, wherein the one or more codebook parameters comprise at least one of a number of the at least one second CSI feedback stage, a maximum supported rank for the at least one second CSI feedback stage, a number of beams for each of the at least one second CSI feedback stage, a power weighting for each of the at least one second CSI feedback stage, or a cophasing indication for each of the at least one second CSI feedback stage.

23. An apparatus for wireless communication, comprising:
a receiver configured to:
receive one or more first feedback components associated with first channel state information (CSI) feedback; and
receive one or more second feedback components associated with at least one second CSI feedback;
at least one processor configured to determine a precoding to use for multiple input multiple output (MIMO) communications based on the one or more first feedback components and the one or more second feedback components; and
a memory coupled to the at least one processor.

24. The apparatus of claim 23, wherein:

the one or more first feedback components comprise a first precoding matrix indicator (PMI), a first channel quality indicator (CQI) and a first rank indicator (RI);

the one or more first feedback components are associated with class A type CSI feedback, Type I CSI feedback or Type II CSI feedback; and the one or more second feedback components comprise a second PMI, a second CQI and a second RI associated with second CSI feedback of the at least one second CSI feedback.

25. The apparatus of claim 24, wherein:

the first PMI comprises a beam selection for a first one or more beams, a power weighting for the first one or more beams and cophasing indicator for the first one or more beams; and the second PMI comprises a beam indication for a second one or more beams, a power weighting for the second one or more beams, and cophasing indicator for the second one or more beams.

26. The apparatus of claim 24, wherein the at least one processor is configured to determine the precoding by adding the first PMI to the second PMI.

27. The apparatus of claim 23, further comprising:

a transmitter configured to transmit an indication of a codebook configuration for the first CSI feedback, wherein the codebook configuration is based on class A type CSI feedback, Type I CSI feedback or Type II CSI feedback.

28. The apparatus of claim 23, further comprising:

a transmitter configured to transmit an indication of one or more codebook parameters for the at least one second CSI feedback, wherein the one or more codebook parameters comprise at least one of a number of second CSI feedback stages for reporting the at least one second CSI feedback, a maximum supported rank for the second CSI feedback stages, a number of beams for each of the second CSI feedback stages, a power weighting for each of the second CSI feedback stages, or a cophasing indication for each of the second CSI feedback stages.

* * * * *